Nov. 18, 1924.
E. O. WENK
1,516,168
STOCK MEASURING AND CUTTING-OFF MACHINE
Filed Jan. 9, 1924 2 Sheets-Sheet 1
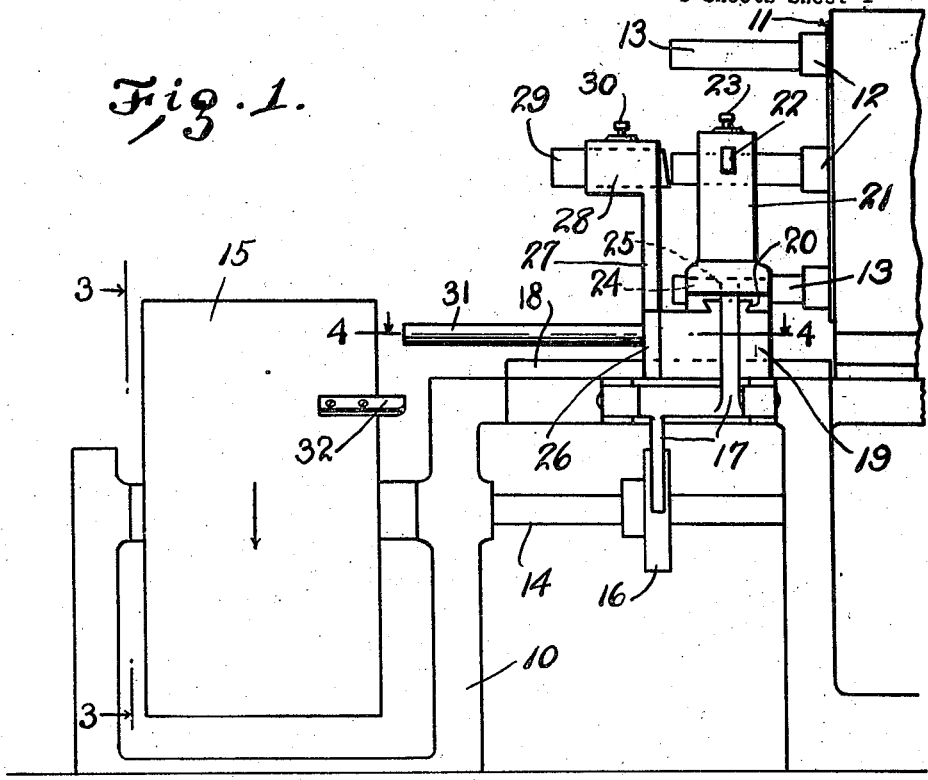
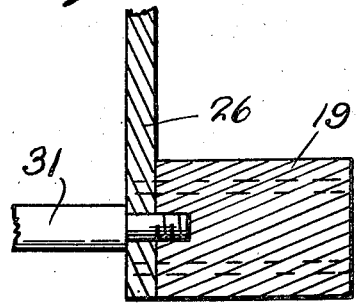
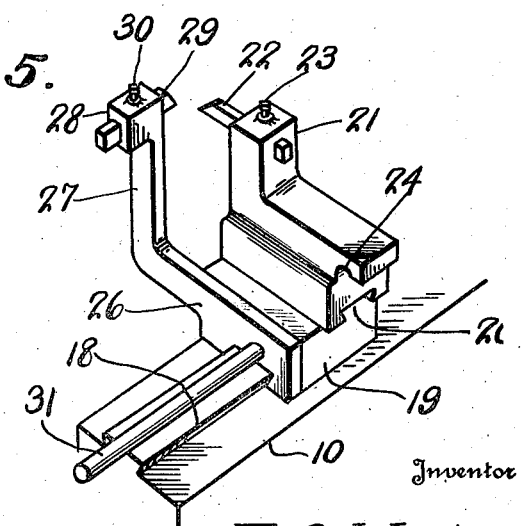
Inventor
E. O. Wenk
By L. B. James
Attorney Nov. 18, 1924.  
E. O. WENK  
1,516,168  
STOCK MEASURING AND CUTTING-OFF MACHINE  
Filed Jan. 9, 1924  
2 Sheets-Sheet 2
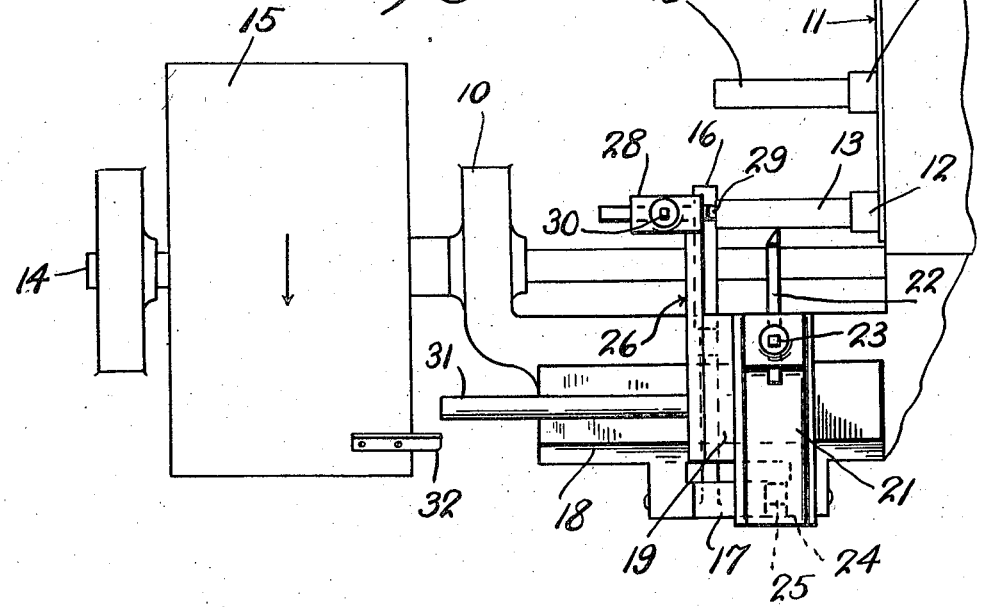
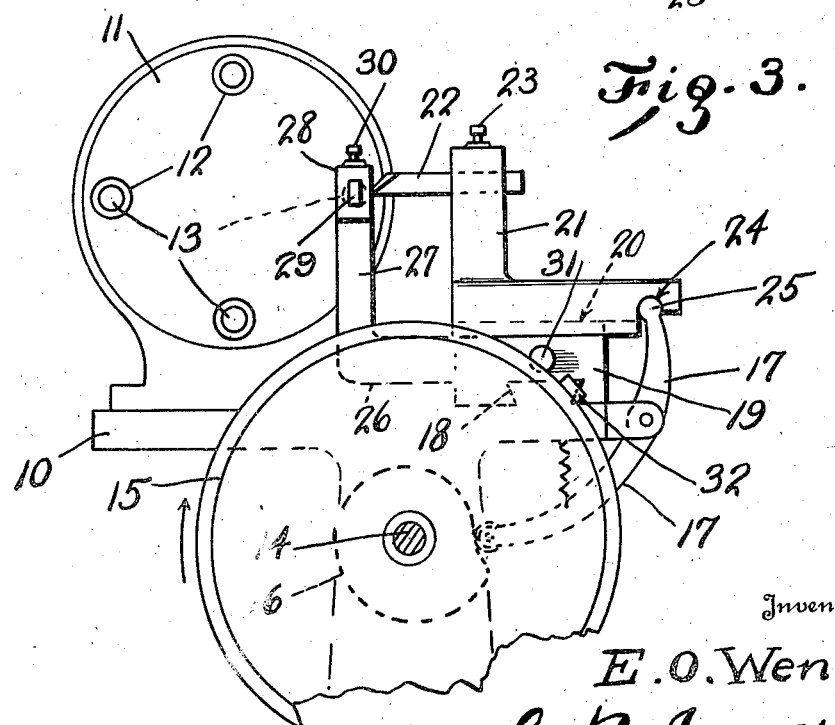
Inventor  
E. O. Wenk  
By L. B. James  
Attorney Patented Nov. 18, 1924.

1,516,168

UNITED STATES PATENT OFFICE.

EDWIN O. WENK, OF ANN ARBOR, MICHIGAN.

STOCK-MEASURING AND CUTTING-OFF MACHINE.

Application filed January 9, 1924. Serial No. 685,287.

*To all whom it may concern:*

Be it known that I, EDWIN O. WENK, a citizen of the United States, residing at Ann Arbor, in the county of Washtenaw and State of Michigan, have invented new and useful Improvements in Stock-Measuring and Cutting-Off Machines, of which the following is a specification.

This invention relates to multiple spindle automatic lathes and has special reference to a length sizing device for the cutting off tool used in such machines.

Heretofore it has been common to provide, in such machines, a cutting off tool so mounted as to reciprocate across the machine at the cutting off station and adjustments have been provided to permit this tool to reciprocate in such a path as to cut off an assumed correct length from the stock bar to form the desired article. However, the path of reciprocation, once an adjustment has been made becomes a fixed path and, since the stock bar is not always correctly positioned in its chuck for various reasons, the length cut off is frequently at variance with the length which should be cut off. This causes much waste of material and time, and the principal and most important objects of this invention are to provide novel and efficient means whereby a truly correct length may be invariably cut from the stock bar irrespective of the slight differences in projection from the chuck of successive lengths of bars acted upon.

With the above and other objects in view as will be hereinafter apparent, the invention consists in general of certain novel details of construction and combinations of parts hereinafter more fully described, illustrated in the accompanying drawings, and specifically claimed.

In the accompanying drawings like characters of reference indicate like parts in the several views, and:

Fig. 1 is a side view of a portion of an automatic screw forming machine with the invention applied thereto.

Fig. 2 is a plan view of Fig. 1.

Fig. 3 is a sectional view on line 3—3 of Fig. 1.

Fig. 4 is a similar view on line 4—4 of Fig. 1.

Fig. 5 is a detail perspective view of the gage and cutting tool carriage.

In the present embodiment of the invention, the same is shown applied to a four spindle automatic lathe of which certain parts are disclosed in their relation to the device, the disclosed parts being simply indicated in outline as these parts are, in detail, old and well known and the specific constructions thereof form no part of this invention.

The machine shown is provided with the usual bed 10 whereon is mounted the intermittently revolving head 11 carrying the revolving bar holding chucks 12 supporting the bars 13. The bed 10 also supports a shaft 14 whereon is located a main cam drum 15 and a cut off slide operating cam 16 oscillating a lever 17. On the bed 10 is also a guide way 18 extending longitudinally of the bed 10 and guiding for longitudinal movement along the bed a compound tool rest consisting of a bottom member 19 having a transverse guide 20 on its upper side, and a top member 21 mounted to reciprocate transversely of the lower member, and consequently of the bed, on said guide 20. This upper member 21 constitutes the tool holder and supports the cutting off tool 22 which is held adjusted in the tool holder by the set screw 23. The reciprocation of this upper member is effected by means of the lever 17, and in order that this may be done without interfering with the longitudinal movement of the member 19 on its guide, there is provided on the under side of the member 21 a groove 24 receiving a ball 25 formed on the end of said lever 17. All of these parts, while entering intimately into the operation of the present invention, are in themselves quite common in machines of this description. The remaining parts of the machine, such as the forming tools, the bar feeding and chuck operating mechanisms and the like are in no way related to the present invention, and are accordingly omitted from the drawings in the interests of clearness in the showing.

Those parts which more particularly characterize the invention comprise a standard or support preferably of L-shape and having one arm 26 horizontally disposed and secured to the member 19, the other arm 27 projecting vertically upward from the inner end of the first arm and being provided at its upper end with an apertured head 28 wherein is mounted an adjustable stop 29 secured in its adjusted position by a set screw 30. This stop has a bevelled end which is in alinement with the bar 12 which is at the cutting off station and which, whenever too close to the head 11, is engaged by the end of the bar, so as to cause movement of the tool holder away from the head, as the latter is moved into position at the cutting off station by the rotation of said head. Thus, by properly adjusting this stop 29 in its relation to the tool 22 and bringing the stop into contact with the end of the bar to be cut off, the cutting off will be effected at the correct point and all pieces thus cut off will be of the same length so long as the adjustment is maintained.

In order to provide for moving the stop into contact with the end of the bar 13 at the cutting off station, in the event such contact is not obtained by the revolution of the head as above described, there is provided a push bar 31 which has one end fixed to the support arm 26 and its other end projecting close to the main cam drum 15 so as to be engaged by a cam member 32 fixed on said drum and engaging the end of the push bar to shove the same toward the head 11 as the drum rotates. This cam 32 is so positioned on the drum 15 as to move the push bar, and consequently the stop 29 toward the head 11 in the interval between the cutting off a piece from one stock bar end and the movement of the succeeding stock bar into cutting off position. Thus, after each cutting off operation the tool 22 and stop 29 are moved toward the right in Fig. 1 so that the end of the succeeding stop bar, as it moves to cutting off position, engages the stop 29 and moves it and the tool 22 back to the left. Consequently, the tool carriage or support constantly reciprocates longitudinally to a slight degree, the tool at the time it is fed through the revolving stock bar being always in position to cut off the correct amount.

There has thus been provided a simple and efficient device of the kind described and for the purpose specified.

It is obvious that minor changes may be made in the form and construction of the invention without in any way departing from the material spirit thereof. It is not, therefore, desired to confine the invention to the exact form herein shown and described, but it is wished to include all such as properly come within the scope claimed.

Having thus described the invention, what is claimed as new, is:

1. In a multiple spindle automatic lathe having an intermittently revolving head, a series of revolving stock bar holding chucks carried by said head, a compound tool rest including a lower member movable longitudinally of the machine and an upper member carried with the lower member and reciprocable transversely of the machine, said upper member constituting a holder for a cutting tool, and a stop member carried by the lower movable member in the path of the stock bars, means actuated by the operation of the machine for automatically sliding the lower member longitudinally of the machine prior to the action of the cutting off tool on the stock bars successively presented thereto to cause the cutting off tool to act on said stock bars at a predetermined equal distance from the ends of the successively presented stock bars.

2. In a multiple spindle automatic lathe having an intermittently revolving head, a series of revolving stock bar holding chucks carried by said head, a compound tool rest including a lower member movable longitudinally of the machine and an upper member carried with the lower member and reciprocable transversely of the machine, said upper member constituting a holder for a cutting off tool, and means actuated by the operation of the machine for automatically sliding the lower member longitudinally of the machine prior to the action of the cutting off tool on the stock bars successively presented thereto to cause the cutting off tool to act on said stock bars at a predetermined equal distance from the ends of the successively presented stock bars, and including an element supported from the tool rest and engageable by the bars successively as they are moved by the head to cutting off position.

3. In a multiple spindle automatic lathe having an intermittently revolving head, a series of revolving stock bar holding chucks carried by said head, a compound tool rest including a lower member movable longitudinally of the machine and an upper member carried with the lower member and reciprocable transversely of the machine, said upper member constituting a holder for a cutting off tool, means actuated by the operation of the machine for automatically sliding the lower member longitudinally of the machine prior to the action of the cutting off tool on the stock bars successively presented thereto to cause the cutting off tool to act on said stock bars at a predetermined equal distance from the ends of the successively presented stock bars, and including a stop member having a face bevelled for engagement by the ends of the stock bars successively as they are moved to cutting off position by the head, said stop member being adjustably supported on the tool rest, and means to hold the stop member in adjusted position.

4. In a multiple spindle automatic lathe having an intermittently revolving head, a series of revolving stock bar holding chucks carried by said head, a compound tool rest including a lower member movable longitudinally of the machine and an upper member carried with the lower member and reciprocable transversely of the machine, said upper member constituting a holder for a cutting off tool, means actuated by the operation of the machine for automatically sliding the lower member longitudinally of the machine prior to the action of the cutting off tool on the stock bars successively presented thereto to cause the cutting off tool to act on said stock bars at a predetermined equal distance from the ends of the successively presented stock bars, and including a stop member having a face bevelled for engagement by the ends of the stock bars successively as they are moved to cutting off position by the head, said stop member being adjustably supported on the tool rest, means to hold the stop member in adjusted position, and the other elements cooperating to move the tool rest towards the head in the intervals between successive engagements of the stock bars with the stop member.

5. In a multiple spindle automatic lathe having an intermittently revolving head, a series of revolving stock bar holding chucks carried by said head, a compound tool rest including a lower member movable longitudinally of the machine and an upper member carried with the lower member and reciprocable transversely of the machine, said upper member constituting a holder for a cutting off tool, means actuated by the operation of the machine for automatically sliding the lower member longitudinally of the machine prior to the action of the cutting off tool on the stock bars successively presented thereto to cause the cutting off tool to act on said stock bars at a predetermined equal distance from the ends of the successively presented stock bars, and including a stop member having a face bevelled for engagement by the ends of the stock bars successively as they are moved to cutting off position by the head, said stop member being adjustably supported on the tool rest, means to hold the stop member in adjusted position, and other elements cooperating to move the tool rest towards the head in the intervals between successive engagements of the stock bars with the stop member, said other elements including a revolving member, cam means carried thereby, and a push bar supported from the tool rest in the path of said cam means, said cam means being positioned on the revolving member to engage the push bar prior to each engagement of the stop member by a stock bar.

In testimony whereof I affix my signature.

EDWIN O. WENK.